United States Patent [19]

Crampton et al.

[11] Patent Number: 5,757,986
[45] Date of Patent: May 26, 1998

[54] INTEGRATED SILICON PIN DIODE ELECTRO-OPTIC WAVEGUIDE

[75] Inventors: Stephen James Crampton, Waltham Cross; Arnold Peter Roscoe Harpin, Oxon; Andrew George Rickman, Marlborough, all of United Kingdom

[73] Assignee: Bookham Technology Limited, United Kingdom

[21] Appl. No.: 617,810

[22] PCT Filed: Sep. 21, 1993

[86] PCT No.: PCT/GB93/01983

§ 371 Date: Mar. 20, 1996

§ 102(e) Date: Mar. 20, 1996

[87] PCT Pub. No.: WO95/08787

PCT Pub. Date: Mar. 30, 1995

[51] Int. Cl.$^6$ .................... G02F 1/035; G02B 6/10
[52] U.S. Cl. .................... 385/2; 385/3; 385/40; 385/8; 385/131; 385/132
[58] Field of Search .................... 385/2, 3, 40, 41, 385/130, 131, 132, 8, 14

[56] References Cited

U.S. PATENT DOCUMENTS

| 4,787,691 | 11/1988 | Lorenzo et al. | 385/3 |
|---|---|---|---|
| 4,857,973 | 8/1989 | Yang et al. | 257/73 |
| 4,877,299 | 10/1989 | Lorenzo et al. | 385/3 |
| 4,958,898 | 9/1990 | Friedman et al. | 385/3 |
| 4,997,246 | 3/1991 | May et al. | 385/2 |
| 5,107,538 | 4/1992 | Benton et al. | 385/130 |
| 5,125,065 | 6/1992 | Stoll et al. | 385/130 |
| 5,157,748 | 10/1992 | Mueller et al. | 385/131 |
| 5,566,257 | 10/1996 | Jaeger et al. | 385/2 |

OTHER PUBLICATIONS

Giguere, Stephen R., et al., "Stimulation studies of silicon electro–optic waveguide devices", *Journal of Applied Physics*, vol. 68, No. 10, Nov. 5, 1990, pp. 4964–4970.

Friedman, Lionel, et al., "Silicon double–injection electro–optic modulator with junction gate control", *Journal of Applied Physics*, vol. 63, No. 6, Mar. 1988, 1831–1839.

Schmidtchen, J. et al., "Low Loss Singlemode Optical Waveguides With Large Cross–Section In Silicon–On–Insulator", *Electronics Letters*, vol. 27, No. 16, Aug. 1991, pp. 1486–1488.

*Primary Examiner*—Rodney B. Bovernick
*Assistant Examiner*—Hemang Sanghavi
*Attorney, Agent, or Firm*—Webb Ziesenheim Bruening Logsdon Orkin & Hanson, P.C.

[57] ABSTRACT

The device comprises a layer of silicon separated from a substrate by a layer of insulating material. A rib having an upper surface and two side surfaces is formed in the layer of silicon to provide a waveguide for the transmission of optical signals. A lateral doped junction is formed between the side surfaces of the rib such that an electrical signal can be applied across the junction to control the density of charge carriers across a substantial part of the cross-sectional area of the rib thereby actively altering the effective refractive index of the waveguide.

16 Claims, 2 Drawing Sheets

INTEGRATED SILICON PIN DIODE ELECTRO-OPTIC WAVEGUIDE

TECHNICAL FIELD

This invention relates to electro-optic devices such as integrated silicon waveguides for use in optical circuits and the modulation of light within these circuits and also to a method of manufacturing such devices.

BACKGROUND ART

Integrated optical waveguide circuits, analogous to integrated electronic circuits, comprise optical waveguides formed on a substrate. Modulation of light propagating in these waveguides is achieved by actively altering the optical properties of the waveguide circuit media.

The application of integrated optics is most common in fiber optic communication, though many other applications exist. Common optical functions for which integrated optics is utilized include directional switching, phase modulation and intensity modulation.

Several active integrated optical systems have been based on silicon. The advantages of silicon integrated optical devices include the potential use of standard silicon integrated electronic circuit manufacturing technology and the integration of optical and electronic circuits on one silicon device. For the effective use of silicon integrated optics it is considered important to produce a low loss waveguide structure (i.e. less than 1 dB/cm) with electrically controllable modulation utilizing standard planar silicon electronic integrated circuit manufacturing technology. The prior art has so far failed to fully satisfy these combined requirements.

U.S. Pat. No. 4,746,183 and U.S. Pat. No. 4,787,691 describe a number of active waveguide devices utilizing a vertical doped junction in a silicon rib waveguide, i.e. a diode formed between an electrode on the upper surface of the rib and an electrode on the opposite side of the device. The devices may be constructed using a highly doped substrate, acting as a lower waveguide cladding but these will suffer from high optical losses due to the high free carrier absorption of the guided wave's evanescent field travelling in the substrate. An alternative structure uses a buried silicon dioxide cladding which has lower optical losses (providing the buried silicon dioxide layer is thick enough to fully confine the guided wave). However, this arrangement requires additional manufacturing steps in order to make a break in the buried insulator layer to provide an electrical contact to a low resistance substrate.

EP-A-0,433,552 describes an active silicon waveguide device constructed in a rib waveguide on silicon dioxide. In a first arrangement a vertical p/n junction is formed in the rib with one electrical contact on the upper surface of the rib and another (in the form of a heavily doped n-region) formed on the upper surface of the silicon layer adjacent the rib. The current flow between these electrical contacts (which alters the charge carrier density in the waveguide) does not therefore extend across the whole of the cross-sectional area of the rib. This may be of little importance for devices of sub-micron dimensions (as described in this prior art) but with devices which are large enough to be compatible with fiber optics (which typically have a core section diameter of around 8 microns), this reduces the overlap between the charge carriers and the guided wave which reduces the effective refractive index change of the waveguide for a given current. This may mean that the device has to be operated in a current saturation mode, which reduces switching speed, in order to achieve a useful refractive index change in the waveguide.

In another arrangement described in EP-A-0433552, a lateral bipolar transistor is provided in a planar waveguide comprising a silicon layer over a layer of silicon dioxide on a silicon substrate. This arrangement leads to a waveguide structure with high optical losses due to the absorption of the guided waves evanescent field in the highly doped regions of the transistor. Also, such a structure can only be formed in a planar waveguide less than one micron thick as it is difficult to introduce dopants in evenly distributed concentrations for a depth greater than about 0.5 microns.

Silicon waveguide modulation devices which utilize field effect transistors to vary free carrier concentration in the waveguides by free carrier injection and depletion have also been proposed (as in GB-A-2,230,616 for instance). However, these devices require waveguides with sub-micron dimensions so precluding these devices from applications requiring low-loss connections with optical fibers and means that the devices are expensive to manufacture as they cannot be formed from readily available silicon on silicon dioxide wafers for reasons which will be explained in more detail below.

DISCLOSURE OF INVENTION

According to a first aspect of the present invention, there is provided an electro-optical device comprising a layer of silicon separated from a substrate by a layer of insulating material with a rib comprising an upper surface and two side surfaces formed in the layer of silicon to provide a waveguide for the transmission of optical signals and means for controlling the density of free charge carriers in the rib so as to alter the effective refractive index of the waveguide, characterized in that said means is in the form of a lateral doped junction comprising a p-doped region and an n-doped region on opposite sides of the rib to form a pin diode arranged such that an electrical signal can be applied across the junction so as to inject free charge carriers into the rib and in that the dimensions of the rib forming the optical waveguide are large enough to be compatible with fiber optics.

The invention also relates to the use of such a device as an optical phase modulator and as an optical switch.

According to a second aspect of the invention, there is provided a method of manufacturing an electro-optical device comprising the following steps: selecting a silicon-on-insulator wafer; increasing the thickness of the silicon layer thereof by epitaxial growth; etching the silicon layer to form a rib waveguide therein having dimensions large enough to be compatible with fiber optics and forming a lateral doped junction comprising a p-doped region and an n-doped region on opposite sides of the rib so as to form a pin discs.

Preferred features of the invention will be apparent from the following description and the subsidiary claims of the specification.

BRIEF DESCRIPTION OF DRAWINGS

The invention will now be further described, merely by way of example, with reference to the accompanying drawings, in which.

BEST MODE OF CARRYING OUT THE INVENTION

It should be noted that for convenience of description terms such as 'lateral', 'vertical', 'side', 'top' etc. used in this specification refer to directions relative to a device in the orientation shown in the accompanying drawings. These terms should not, however, be interpreted as restricting the scope of the claimed invention which may in practice be used in any orientation.

Figure 1:
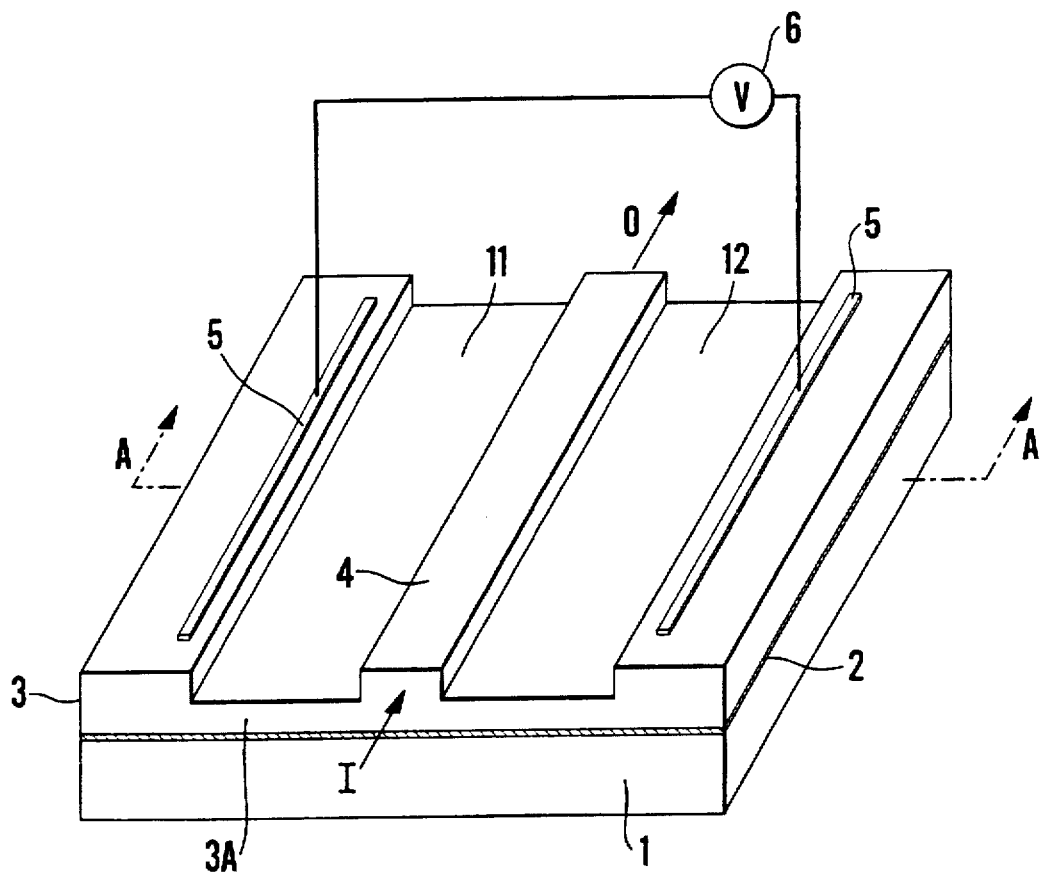
FIG. 1 shows a perspective view of a single mode rib optical waveguide according to one embodiment of the invention.

The device illustrated in FIG. 1 comprises a nominally intrinsic silicon crystal layer 3 separated from a silicon substrate 1 by an insulating layer 2, for instance of silicon dioxide. A rib 4 having a top surface 4A and side surfaces 4B and 4C is formed in the silicon layer 3 to act as a waveguide for the transmission of optical signals in the direction indicated by the arrows I O in the drawing. Light is confined within the waveguide in the vertical direction by the silicon dioxide layer 2, which has a refractive index less than the silicon layer 3, and by either air, or any other medium with a lower refractive index than silicon (e.g. silicon dioxide), on the top surface. Horizontal confinement of the light under the rib 4 is achieved by the lower effective refractive index of the surrounding slab waveguide 3A.

The device is preferably designed so that it can be constructed using conventional silicon on insulator wafers which are manufactured primarily for the construction of Very Large Scale Integrated (VLSI) electronic integrated circuits. A particular type of silicon on insulator wafer favored for VLSI applications is formed by implanting a silicon wafer with oxygen and then annealing the wafer.

This process is described in a paper 'Reduced defect density in silicon-on-insulator structures formed by oxygen implantation in two steps' by J. Morgail et al. Appl.Phys.Lett., 54, p526, 1989. The wafer formed by this process comprises a top layer of silicon approximately 0.1 to 0.2 microns thick separated from the silicon substrate by a layer of silicon dioxide which is typically around 0.4 microns thick. This structure, as it stands, does not lend itself to the construction of low loss optical waveguides as the buried oxide layer is insufficiently thick to fully confine the optical waveform's evanescent field. These losses can be reduced either by increasing the thickness of the oxide layer or by making the top layer of silicon thicker.

Increasing the thickness of the oxide layer by whatever means both tends to increase the defect density in the top layer of silicon and increases the cost of production. Other methods of constructing a silicon on insulator wafer which might achieve a thicker oxide layer are not preferred for VLSI applications so do not benefit from the economics of scale associated with oxygen implanted material and therefore tend to be much more expensive.

The preferred method of forming a silicon on insulator device such as that illustrated in the drawings is to modify a conventional silicon on insulator wafer of the type described above by increasing the thickness of the top layer of silicon. This is easily achieved by growing the layer of silicon to a thickness of a few microns, e.g. from 2 to 8 microns. A rib can then be formed in this layer of silicon using conventional etching techniques. A rib waveguide constructed in this manner thus has the following important properties:

(1) due to the high degree of optical confinement, it has low optical losses
(2) having dimensions of several microns, it is compatible with fiber optics
(3) as it can be formed by a simple modification of a conventional silicon on insulator wafer, it is relatively inexpensive to manufacture.

Such a method for making an optical waveguide for optical signals in the wavelength range of 1.2 to 1.6 microns is described in a paper 'Low Loss Single mode Optical Waveguides with large Cross-Section in Silicon-on-Insulator' by J. Schmidtchen et al. Electronic Letters, 27, p.1486, 1991.

As will be described further below a lateral doped junction in the form of a diode is formed in the rib 4 of the device shown in FIG. 1 and metallized contacts 5 are provided for connection to an electronic drive 6 which can provide a modulated voltage across the diode.

Figure 2:
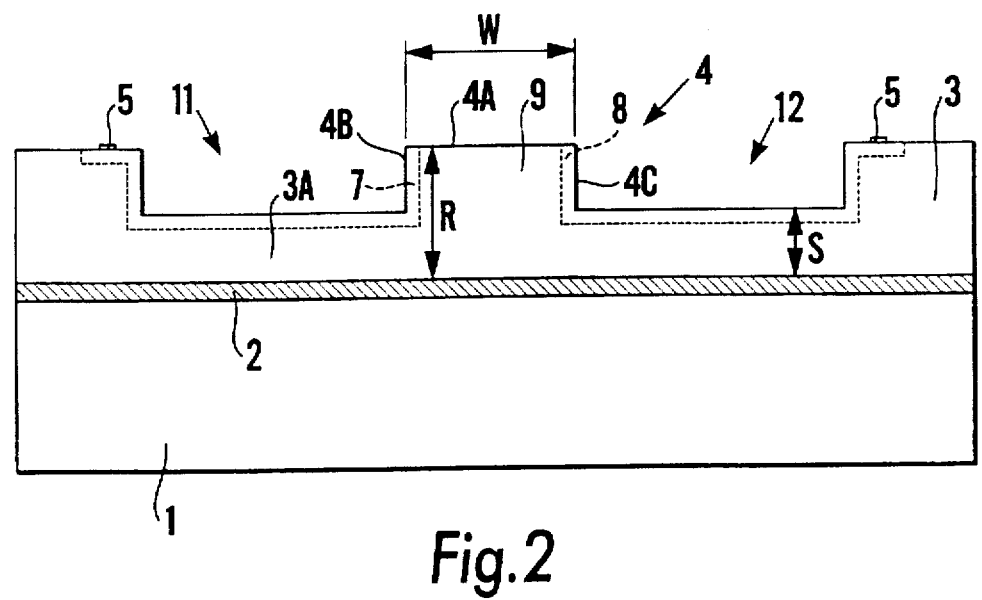
FIG. 2 is a cross-section of a view along line A—A of the waveguide shown in FIG. 1.

With reference to FIG. 2, which is a cross-section A—A through the device in FIG. 1, it can be seen that the diode is formed in the rib 4 as two heavily doped (approximately $\geq 10^{19}$ impurity atoms/cm$^3$) regions 7 and 8 formed in the sides of the rib 4; one region 7 is n doped while the other regions is p doped. The region 9 between the two highly doped regions 7 and 8 is either lightly doped n or p, or nominally undoped. Such a diode is known as a pin diode. The doping concentrations of the junction 7, 8 and 9 are selected such that when a forward bias voltage is applied to the diode a free carrier injection zone extends across the region 9 (electrons are injected from the n type region 7 into region 9 and holes are injected from the p type region 8 into region 9). The doped regions 7 and 8 extend along a length of the rib 4 determined by the desired interaction length of the device.

It is important to note that, unlike the prior art, a lateral diode, i.e. one which is formed across the rib between the side faces thereof, is used rather than either a vertical diode or a diode extending along the length of the rib. The contacts 5 made to the regions 7 and 8 may be positioned at any distance from the rib 4, and may even be formed on the side walls of the rib 4. The closer the contacts 5 are placed to the rib side walls, the lower will be the junction resistance caused by the doped regions 7 and 8. However, the closer the metal contacts 5 are to the rib side walls, the greater the optical loss through coupling of the guided wave's evanescent field to the metal contacts 5. A design compromise has to be achieved between these factors depending on the particular application. The contacts 5 preferably extend along the length of the doped regions 7 and 8.

With reference to FIGS. 1 and 2, modulation of the forward bias voltage modulates the free carrier concentration in the top of the rib waveguide over the length of the diode junction and results in modulation of the refractive index in this part of the rib waveguide by mechanisms well known to the man skilled in the art. In turn, this refractive index modulation modulates the modal propagation constants of the rib waveguide resulting in a modulation in the effective refractive indices and the effective length of the rib waveguide. Modulation of the effective length of the waveguide modulates the phase difference between the light entering the device at I and exiting at O. Hence, the device illustrated in FIGS. 1 and 2 can be used as an optical phase modulator.

A lateral diode of the type described has the advantage that it controls the free carrier density across that part of the cross-section of the rib in which the optical wave is confined, in this case across the region 9, and so maximises the effective overlap between the optical wave travelling through the waveguide and the region in which the refractive index is changed. The greater this overlap, the greater the change in effective refractive index of the waveguide. If the overlap is reduced, the change in effective refractive index is less and so a longer device is required to provide the required modulation.

The surface diffused dopant profiles in regions 7 and 8 will tend to have high concentrations on the surface and reduce with depth into the silicon. The doped regions 7 and 8 have lower refractive indices than intrinsic silicon such as that in region 9. This tends to increase the confinement of the guided optical wave to region 9. Reducing the width of the intrinsic region 9 of the pin junction by increasing the width/depth of doped regions 7 and 8, thus reduces the current required to produce a given refractive index change in region 9. However, the guided optical wave remains substantially confined to region 9 due to the lower refractive indices of regions 7 and 8 and so ensures that the change in effective refractive index of the waveguide mode is maximised, as the overlap between region 9 and the guided optical wave remains high, even though the relative width of region 9 to the overall waveguide rib width, W, has been reduced. Narrowing the junction in this way can result in a five to ten times reduction in the current required for a given phase modulation, but still allows a comparatively large rib waveguide to be used. The intrinsic region 9 (or pseudo intrinsic region if it contains equal numbers of n and p dopants may typically be reduced to around 25% of the width of the rib waveguide. A small, low power, high speed junction is thus effectively formed in a large waveguide which is relatively easy to fabricate.

With such an arrangement, it is also desirable for the n and p doped regions forming the diode in the rib to lie parallel to each other and to be symmetrically arranged on the opposite sides of the rib. This helps ensure that when the diode is forward biased, free carrier injection occurs over the whole of the region 9 and thus optimises the change in refractive index.

The switching speed of the diode is also dependent on the size of the diode, i.e. the distance between the doped regions 7 and 8. The height of the waveguide (i.e. the distance R shown in FIG. 2) should preferably be at least 4 microns to enable low loss connections to be made with optical fibers. However, with this type of device, the width (i.e. the distance W shown in FIG. 2) of the rib 4 or the width of the region 9 can be reduced to improve the switching speed without significantly increasing the optical losses of the waveguide.

With further reference to FIGS. 1 and 2, the rib waveguide 4 is preferably constructed such that only the fundamental mode for a given wavelength range will propagated, all other higher order modes being cut off. This is achieved by allowing the effective refractive index difference, in the horizontal, between the fundamental mode under the rib 4, and the fundamental mode in the surrounding slab 3 waveguide, which is controlled by the ratio of the slab height (S) to the rib height (R) and the ratio of the rib width (W) to the rib height (R), to be sufficiently small to ensure all higher order modes are cut off. To ensure all higher order vertical rib modes are cut off, these vertical rib modes must be of lower effective index than the fundamental vertical slab mode, which is also controlled by the ratio of the slab height (S) to the rib height (R). This will ensure that higher order vertical rib modes are not reactive because they couple into the fundamental vertical slab mode due to the higher effective refractive index of this slab mode (further details of this are given in the paper by J. Schmidtchen et al referred to above).

A rib waveguide constructed on these design rules will ensure predominately single mode operation of the device illustrated in FIGS. 1 and 2.

A specific example of a method of construction and specific dimensions will now be described for a device of the type illustrated FIGS. 1 and 2.

An undoped silicon wafer with a 0.4 micron thick buried layer of silicon dioxide 2 formed by repeated oxygen implantation and annealing (forming a silicon surface crystal layer 3 with few defects) has its surface silicon layer 3 epitaxially grown, using undoped silicon, to a thickness of 4.75 microns. A 1.5 micron layer of silicon dioxide (not shown) is then thermally grown on the surface leaving the silicon layer 3 with a thickness of 4 microns. Alternatively, a 4 thick silicon layer 3 may have a 1.5 micron thick silicon dioxide layer (not shown) deposited on it by some other means.

A rib 4 with a width W of 4.0 microns is then defined by forming two trenches 11, 12 with vertical or near vertical walls and each being approximately greater than 8.5 microns wide, by means of reactive ion etching through the silicon dioxide surface layer (not shown) to a depth in the silicon layer 3 of 1.1 microns. The exposed silicon trenches are then thermally oxidised to give an oxide thickness of 0.5 microns. This thermal oxidations process reduces the surface roughness of the side walls 4B, 4C of the rib 4 and therefore reduced potential waveguide loss through interface scattering.

The oxide layer thus formed in one trench 11 is removed over a length equal to the desired length of the pin junction by isotropic etching and phosphorous (or boron) is diffused into the bottom and side of the trench by known doping methods to a concentration in excess of $10_{19}$ atoms/cm$^3$ followed by re-oxidation of the trench 11 to yield a 0.5 micron thick layer of silicon dioxide in the trench 11. The dioxide layer in the second trench 12 is then similarly removed and boron (or phosphorous if boron has been diffused into the first trench) is then diffused into the bottom and side walls of the second trench 12 over the same length as for the first trench and to a similar concentration followed by re-oxidation of the trench 12 to yield a 0.5 micron thick layer of silicon dioxide in the trench 12. Diffusion conditions can be varied depending on the desired width of the pin junction. The thickness (or depth) of the doped regions formed in the sides of the rib 4 and in the bottom of the trenches 11 and 12 is typically around 0.2 to 0.5 microns.

This successive oxidation processes result in a silicon rib height (R) of approximately 4 microns, a silicon slab height (S) of approximately 2.4 microns and a silicon rib width (W) of approximately 3 microns.

Contact holes are then etched through to the doped silicon regions underneath. The structure is then metalized with aluminium by known methods and subsequently patterned to provide one electrical contact 5 for the n doped region 7 and another electrical contact 5 for the p doped region 6. The metal contacts 5 can be made remote from the rib waveguide so preventing coupling to the guided wave as discussed above.

Figure 4:
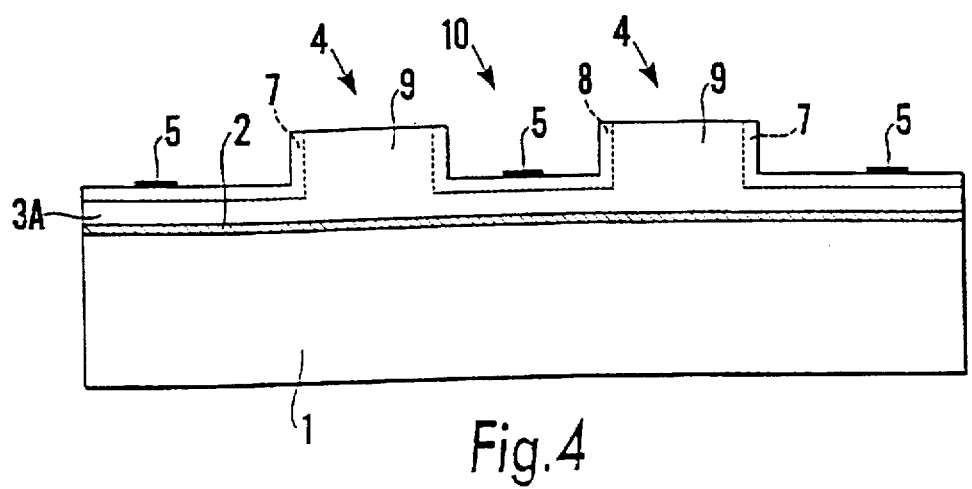
FIGS. 4 is a cross sectional view along line B—B of the switch shown in FIG. 3.

It will be appreciated that electrical connection to the n and p doped regions 7 and 8 formed in the side walls 4B and 4C of the rib is thus provided by the n and p doped regions extending across the bottom of the trenches 11, 12 to the metalized contacts 5. However, electrical connection may be made to the n and p doped regions 7 and 8 in other ways including metalized contacts provided directly on the side walls 4B and 4C of the rib 4 or through contact holes etched in the bottom of the trenches 11, 12 (as shown in FIG. 4).

The length ($L_x$) of the pin junction for a π phase shift, for light with a free space wavelength o, is defined by the change in the effective refractive index (n) of the waveguide (for a given injected free carrier density) by the formula: $L_k = o/2n$.

For the example device described above, assuming an injected carrier density of $10^{18}/cm^3$, the effective refractive index change will be $10^{-3}$ so requiring a length $L_k$ of 520 microns.

For the example described above, the ratio of the slab height S to the rib height R is thus 2.4/3.0, i.e. 0.8/1.0, and the ratio of the rib width W to the rib height R is 3.0/4.0, i.e. approximately 0.75/1.0.

Although the pin type of diode is likely to be preferred in most applications, it will be appreciated that other forms of diode, or other devices comprising a doped junction, known in the art may be used to long as they are arranged laterally as described above.

Figure 3:
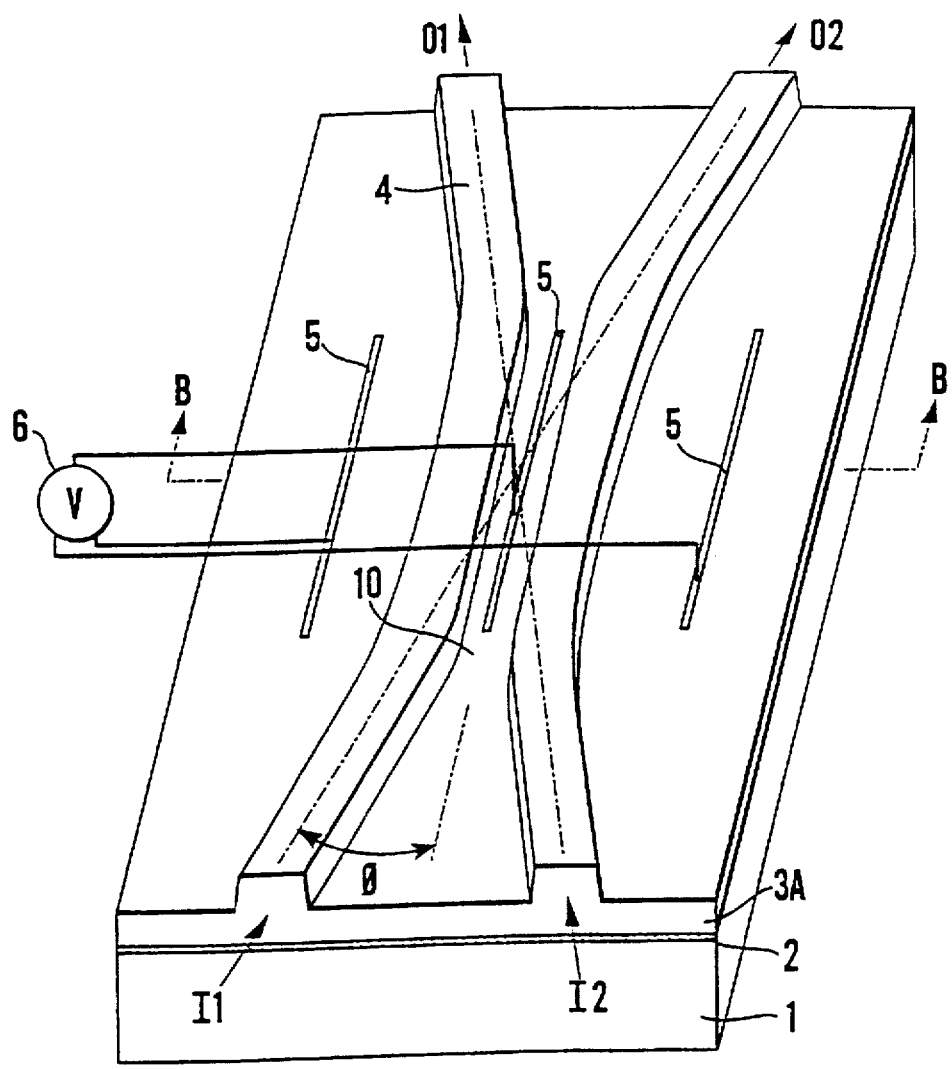
FIG. 3 shows a perspective view of a 2×2 electronically controlled optical switch utilizing waveguides of the type described in relation to FIGS. 1 and 2.

FIG. 3 illustrates the use of a waveguide junction device of the type described above to switch light between one waveguide and another. The waveguide system in FIG. 3 is shown in cross section (B—B) in FIG. 4.

The principle of operation of such switches is well known so will only be briefly described.

With reference to FIG. 3, a cross rib waveguide structure is formed utilizing single mode rib waveguide 4 of the type described with reference to FIG. 1 and 2. Over a region centered about the point of intersection of the principle axis of the two waveguides, two parallel ribe waveguides are formed as a continuation of the waveguides entering/exiting the intersection region. These parallel waveguides have pin junctions formed in them as previously described with reference to FIG. 1 and 2, and are separated from each other by a trench 10.

FIG. 4 illustrates in cross-section the intersection region of the device in FIG. 3. The region between the two parallel waveguides may be doped to form a common junction 8 for both of the pin waveguides. This common center region 8 may be doped either n or p type with the outer regions 7 of the intersection region being doped in the opposite type to the center region 8.

The two junctions can be biased together or independently using the electrical drive 6 (see FIG. 3).

The angle of intersection of the waveguides, is chosen so that total internal reflection of light entering at I1 is maintained in the I1/O1 rib waveguide for zero bias on the two pin junctions. The same situation exists for the I2/O2 waveguide. Therefore, with zero pin junctions bias, light entering the switch at I1 exits from O1 and light entering at I1 exits from O2.

When both junctions are forward biased the effective refractive indices of the pin waveguides decrease, the confinement of the guided waves will be reduced and total internal reflection will no longer occur at the inner parallel pin rib waveguide interfaces 10. This is provided that the horizontal mode angle, , for the pin rib waveguides minus the intersection angle, , is less than the critical angle of reflection, at the pin rib waveguide vertical effective interfaces 10. The light entering at I1 will therefore strongly couple into the I2/O2 waveguide and will exit at O2 and the light entering at I2 will strongly couple into the I1/O1 waveguide and will exit at O1.

For this mode of operation it is also important to ensure that the coupling coefficient, K, between the two pin waveguides results in no net transfer of power from one waveguide to the other for the no bias condition. When the junctions are forward biased, the coupling coefficient, K, will alter and allows a secondary means of varying the light coupled from one waveguide to another.

A second mode of operation involves forward biasing only one of the pin junctions. This will reduce the effective refractive indices of that pin waveguide which will cause light to be strongly coupled from it to the adjacent pin waveguide with zero junction bias and therefore higher effective refractive index. For example, if the I1/O1 pin waveguide is forward biased, light entering the switch at I1 will exit at O2 and light entering at I2 will also exit at O2. Similarly, the inputs I1 and I2 will exit from O1 if the I2/O2 pin junction is forward biased instead of the I1/O2 pin junction.

In both modes of operation the device will perform identically for light propagating in the opposite direction to that used in the description above.

It will be appreciated that a waveguide junction device of one type described above can be used in a wide variety of other applications.

INDUSTRIAL APPLICABILITY

The device described above can be manufactured and used in a wide variety of integrated optical circuits.

We claim:

1. An electro-optic device comprising: a layer of silicon separated from a substrate by a layer of insulating material with a rib comprising an upper surface and two side surfaces formed in the layer of silicon to provide a rib waveguide for the transmission of optical signals and means for controlling the density of free charge carriers in the rib waveguide so as to alter the effective refractive index of the rib waveguide, characterised in that said control means is in the form of a lateral doped junction comprising a p-doped region and an n-doped region on opposite sides of the rib to form a pin diode arranged such that an electrical signal can be applied laterally across the junction so as to inject free charge carriers into the rib waveguide and in that the dimensions of the rib waveguide forming the optical waveguide are large enough to be compatible with fibre optics.

2. A device as claimed in claim 1 in which the p-doped region and the n-doped region are symmetrically arranged on opposite sides of the rib.

3. A device as claimed in claim 1 in which the n-doped region and the p-doped region are separated by a central region comprising one of an intrinsic region, a pseudo intrinsic region and a lightly doped region.

4. A device as claimed in claim 3 in which the central region extends across substantially 25% of the width of the rib.

5. A device as claimed in claim 1 having electrical contacts which are electrically connected to the junction via doped regions in the layer of silicon which extends away from the sides of the rib.

6. A device as claimed in claim 1 in which the thickness of the layer of silicon from the top surface of the rib to the layer of insulation material is between 2 and 8 microns.

7. A device as claimed in claim 6 in which the layer of insulating material comprises silicon dioxide.

8. A device as claimed in claim 7 in which the layer of silicon dioxide is approximately 0.4 microns thick.

9. A device as claimed in claim 8 which has been formed from a conventional silicon-on-insulator wafer having a surface layer of silicon which has been epitaxially grown in increase its thickness.

10. A device as claimed in claim 1 in which the ratio (R:S) of the rib height (R) to the thickness (S) of the silicon layer and the ratio (R:W) of the rib height (R) to the rib width (W)

are selected such that, for a given wavelength, only a fundamental mode in both the vertical and horizontal directions is propagated.

11. An optical phase modulator comprising a device as claimed in claim 1, the alteration of the refractive index being used to alter the effective length of the wave guide.

12. An optical switch comprising a device as claimed in claim 1, the alteration of the refractive index being used to alter the coupling between a first rib waveguide and a second rib waveguide thereof.

13. The use of a device as claimed in claim 1 as an optical phase modulator, the alteration of the refractive index being used to alter the effective length of the waveguide.

14. The use of a device as claimed in claim 1 as an optical switch, the alteration of the refractive index being used to alter the coupling between a first waveguide and a second waveguide thereof.

15. A device as claimed in claim 1 in which the p-doped region and then-doped region are provided in the side faces of the rib waveguide.

16. A device as claimed in claim 1 in which the p-doped region and the n-doped region are provided in the silicon layer on opposite sides of the rib.

* * * * *

UNITED STATES PATENT AND TRADEMARK OFFICE
CERTIFICATE OF CORRECTION

PATENT NO. : 5,757,986   Page 1 of 2
DATED : May 26, 1998
INVENTOR(S) : Stephen James Crampton et al.

It is certified that error appears in the above-identified patent and that said Letters Patent is hereby corrected as shown below:

Column 2 Line 54 "pin discs." should read --pin diode.--.

Column 6 Line 15 "4 thick" should read --4 micron thick--.

Column 6 Line 27 "reduced" should read --reduces--.

Column 6 Line 32 "side" should read --sides--.

Column 6 Line 33 "$10_{19}$" should read --$10^{19}$--.

Column 6 Line 55 "region 6" should read --region 8--.

Column 7 Line 1 "The length ($L_x$)" should read --The length ($L_\pi$)--.

Column 7 Line 5 "$L_k$" should read --$L_\pi$--.

Column 7 Line 8 "$L_k$" should read --$L_\pi$--.

Column 7 Lines 10-11 "slab height 5" should read --slab height S--.

Column 7 Line 26 "waveguide 4" should read --waveguides 4--.

Column 8 Line 18 "one type" should read --the type--.

Claim 9 Column 8 Line 62 delete --conventional--.

UNITED STATES PATENT AND TRADEMARK OFFICE
CERTIFICATE OF CORRECTION

PATENT NO. : 5,757,986
DATED : May 26, 1998
INVENTOR(S) : Stephen James Crampton et al.

It is certified that error appears in the above-identified patent and that said Letters Patent is hereby corrected as shown below:

Claim 9 Column 8 Line 63 "grown in" should read --grown to--.

Claim 10 Column 9 Line 1 "only a" should read --only the--.

Claim 11 Column 9 Line 6 "wave guide" should read --waveguide--.

Claim 15 Column 10 Line 6 "then-doped" should read --the n-doped--.

Signed and Sealed this

Twenty-seventh Day of October, 1998

*Attest:*

BRUCE LEHMAN

*Attesting Officer*  Commissioner of Patents and Trademarks